July 26, 1932.  B. BRONSON ET AL  1,869,332
METHOD OF MAKING STEERING WHEELS
Filed Nov. 18, 1929  3 Sheets-Sheet 1
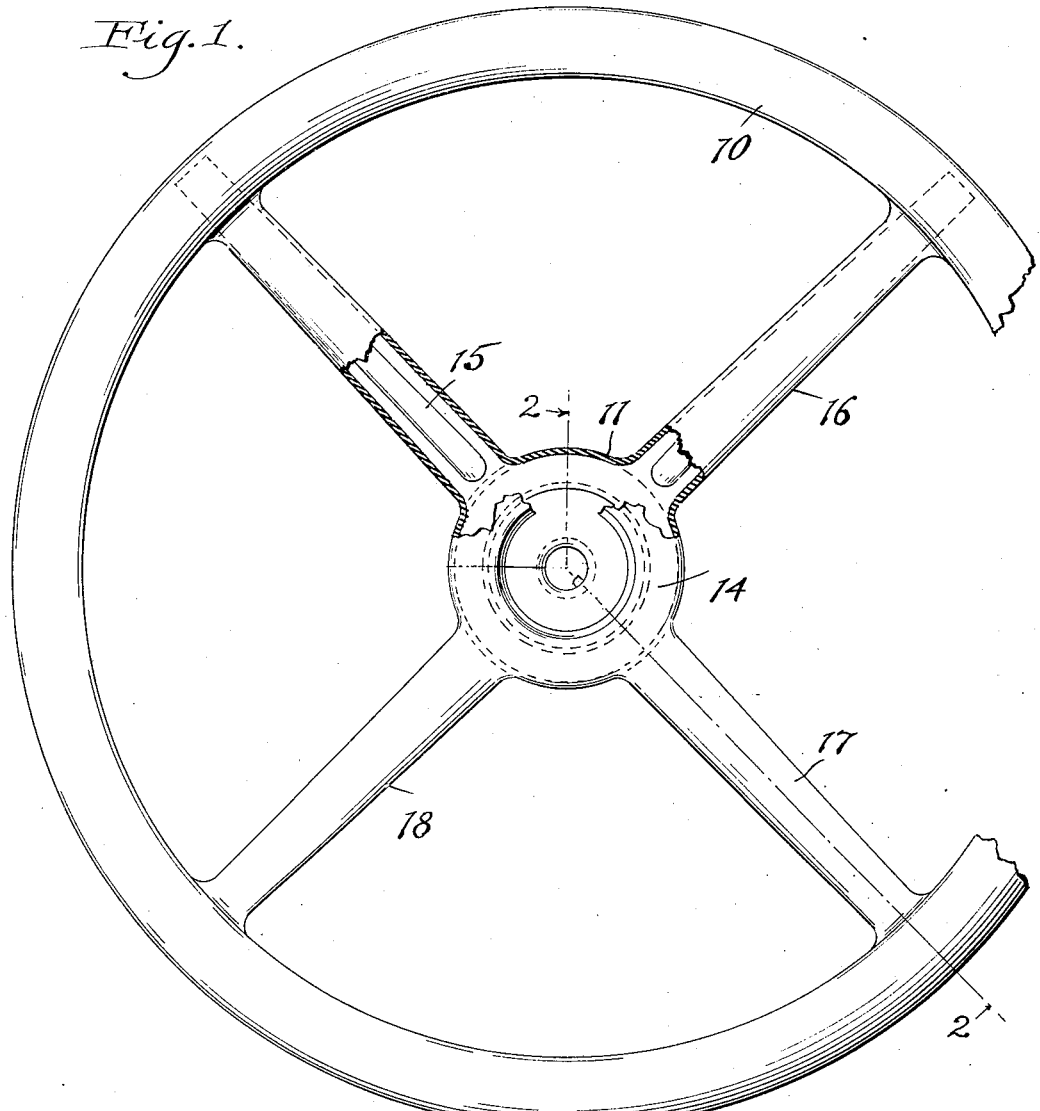
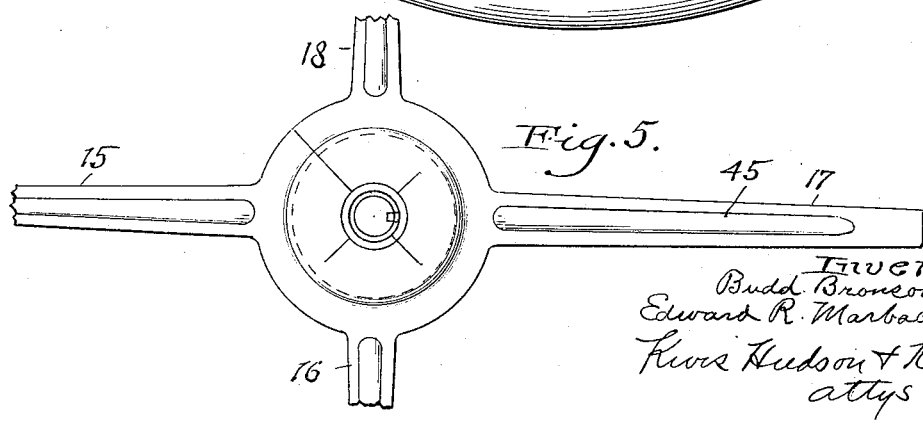

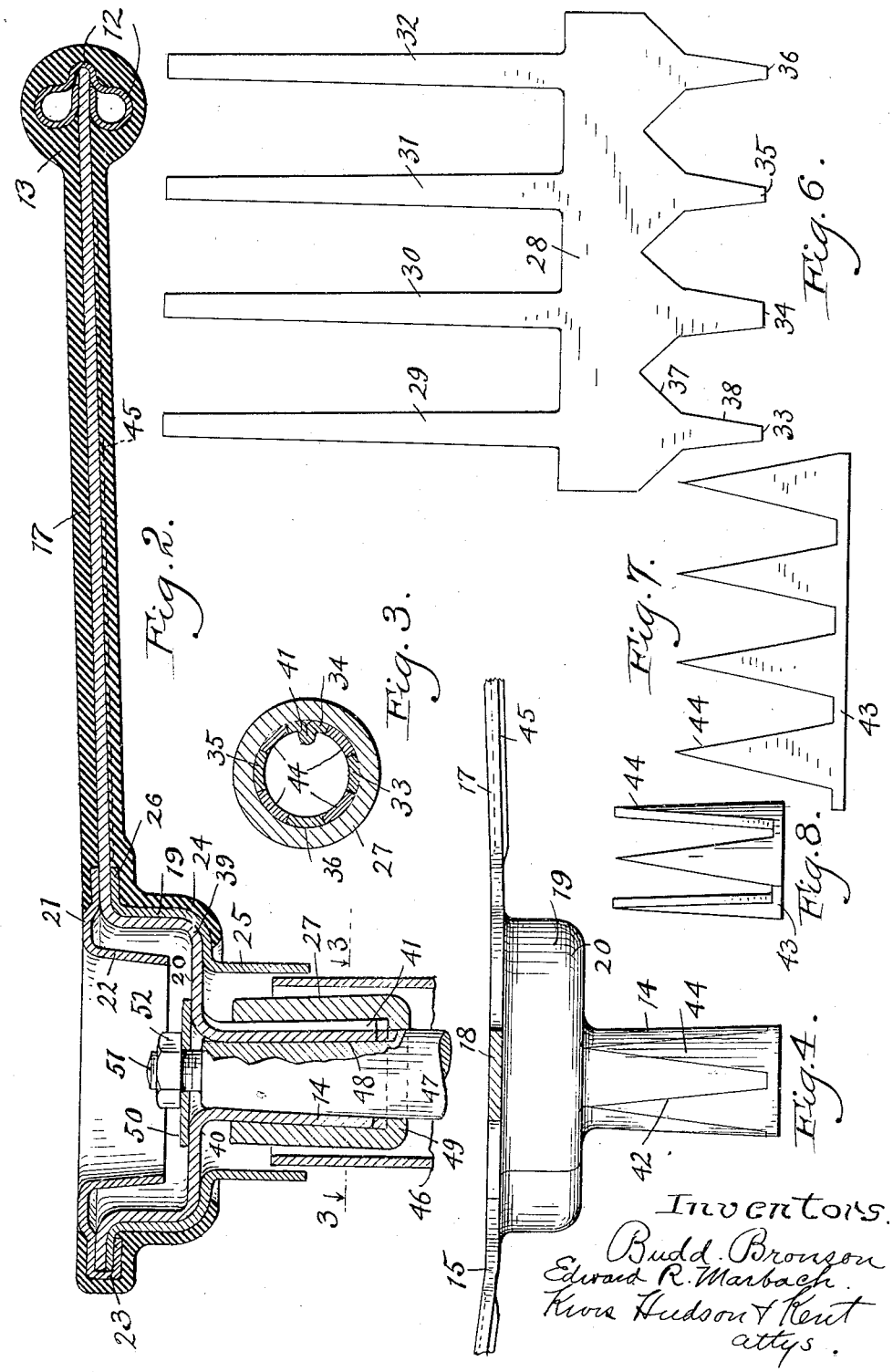

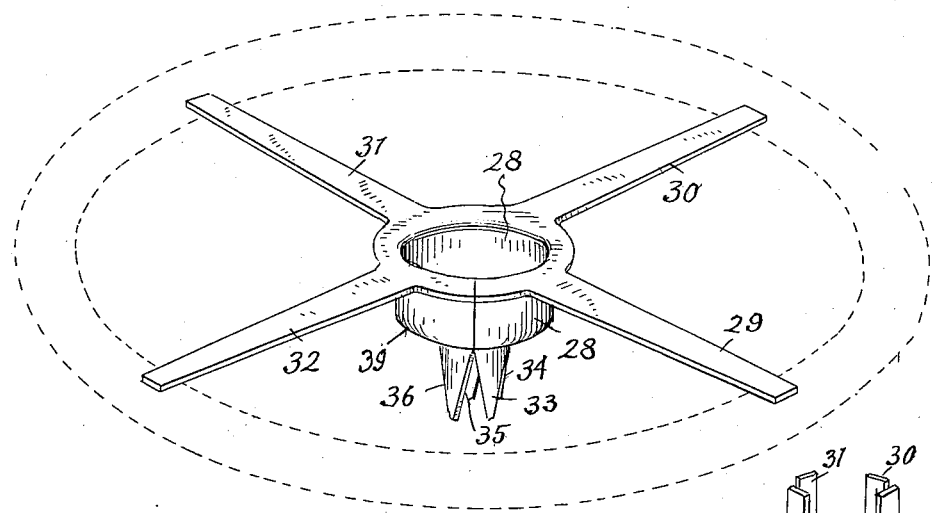
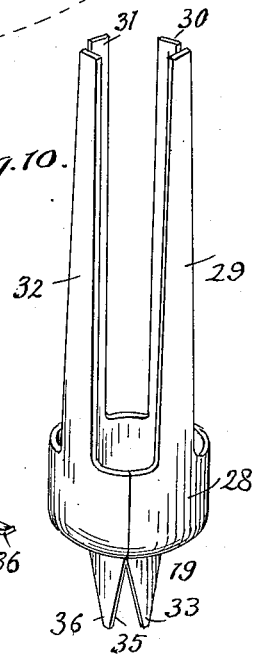
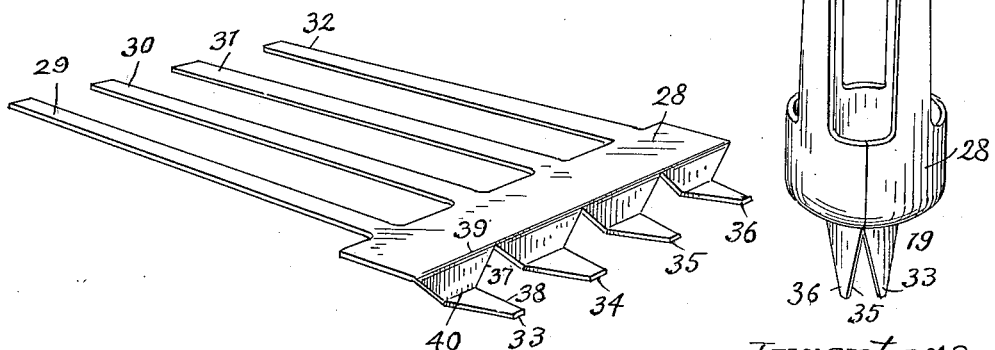

Patented July 26, 1932

1,869,332

UNITED STATES PATENT OFFICE

BUDD BRONSON AND EDWARD R. MARBACH, OF CLEVELAND, OHIO, ASSIGNORS TO THE OHIO RUBBER COMPANY, OF CLEVELAND, OHIO, A CORPORATION OF OHIO

METHOD OF MAKING STEERING WHEELS

Application filed November 18, 1929. Serial No. 407,983.

This invention relates to steering wheels of the type comprising a framework built up largely of sheet metal stampings and generally constituting an insert covered with rubber or other suitable non-metallic surfacing material, and has particular reference to the spider portion of the insert and methods for constructing the same.

Wheels of this character heretofore developed have comprised a central core of cast or forged metal, about which the remainder of the wheel has been built up from a large number of separate parts and by a large number of operations. This core has been the source of considerable difficulty, requiring entirely different manufacture from the remaining parts, hence impeding production and rendering the same complicated and expensive.

It is therefore one object of the present invention to avoid the difficulties inherent in the core above referred to, and in short, to provide a coreless construction.

Further objects of the invention are to simplify and improve the framework and method of constructing the same and to reduce the cost thereof. These objects are attained by reducing the number of parts and operations, and constructing all parts by the same type of manufacture, such as sheet metal stamping.

The invention resides in the integral structure of the spider of the wheel, including the spokes and the hub, the method of constructing this element of a single piece stamped from sheet metal, and the blank from which it is formed, which is shaped so as to avoid excessive scrap in stamping and forming the same.

The invention may be further briefly summarized as consisting in certain novel details of construction and combinations and arrangements of parts which will be described in the specification and set forth in the appended claims.

In the accompanying sheets of drawings,

Fig. 1 is a plan view of a steering wheel constructed according to one embodiment of our invention, parts thereof being broken away and shown in section to illustrate internal construction;

Fig. 2 is a vertical cross-section through the structure shown in Fig. 1, taken along the line indicated at 2—2, and showing additionally the steering column and mast;

Fig. 3 is a transverse section taken along the line 3—3 of Fig. 2;

Fig. 4 is an elevation of the spider element;

Fig. 5 is an inverted plan view of the element shown in Fig. 4;

Fig. 6 is an elevation of a flat sheet metal stamping, from which the spider is formed;

Fig. 7 is a plan view of another stamping forming a filler member for assembly with the stamping shown in Fig. 6;

Fig. 8 is an elevation of the filler member shown in Fig. 7, after the same has been rolled into the desired form.

Fig. 9 is a perspective view of the spider blank after the initial offsets have been formed therein;

Fig. 10 is a perspective view of the same after it has been rolled into the form of a tube, and Figure 11 is a perspective view of the same after the spokes have been bent down therefrom.

Referring more particularly to the drawings, the steering wheel, according to one embodiment of the present invention, comprises a rim 10 and a spider 11. The rim 10 may be of any desired construction, such as, for example, that described in co-pending application Serial No. 367,292, filed May 31, 1929, for a steering wheel. This rim comprises a hollow tubular metal frame member 12, formed in two lobed cross-section as shown in Fig. 2. The ends of the member 12 are connected together in any desired manner, and the ends of the spokes are inserted between the two lobes and pressed therebetween thus securing the spokes to the rim without necessitating bolts, rivets or welding. The rim member 12 and the greater part of the spider 11 are covered with non-metallic surfacing material 13, after the member 12 has been assembled with the spider 11, this material being preferably rubber.

The spider 11 comprises a hub 14 and radial spokes 15, 16, 17 and 18, four being shown, but a greater or less number may be employed if desired. These spokes are generally plain but may be corrugated if desired, as indicated at 45. The hub 14 and the spokes 15, 16, 17 and 18 are preferably formed integrally as a single stamped member 11. This integral construction will be hereinafter described in detail, as it constitutes an important part of the present invention.

The stamping 11, constituting the main member of the spider, after it has been formed or shaped up and as it appears in the finished wheel, may include a central cupped portion which comprises an annular flange 19 depending below the plane of the spokes, and terminating in a flat radial flange 20, formed centrally of which is the hub portion 14.

Overlying the cupper portion is a cover member, which is preferably a metal stamping, comprising a substantially flat annular flange 21 and a depending conical flange 22 which lies within the flange 19 when the flange 21 is in position on top of the member 11. The flange 21 carries projections 23, spaced intermediate the spokes 15, 16, 17 and 18, and adapted to be folded down therebetween to secure the parts in position. A lower cover member 24, snugly fitting the underside of the cupped portion, has a depending flange 25 which is adapted to fit over the steering mast 46 and provide a finished appearance for the completed wheel. The member 24 has a flange 26 similar to the flange 21, and adapted to be secured in place by the folds 23 which extend thereunder.

The hub 14 is tapered to receive the upper end of a steering shaft 47 which is of usual construction, having a keyway 48 adapted to receive a key 41 projecting inwardly from the hub portion 14. A tapered collar 27 is adapted to fit the outside of the hub 14 and hold it snugly against the tapered end of the steering column 47. The collar 27 has an inwardly directed radial flange 49 fitted over the lower end of the hub 14.

The steering wheel as described above, may be constructed and assembled as follows: A blank of the contour shown in Fig. 6 is first cut or stamped from a flat piece of sheet metal. This blank comprises a body portion 28, which constitutes substantially a transverse band, from one edge of which project fingers 29, 30, 31 and 32 which are adapted to form the spokes of the steering wheel. From the other edge of the band 28 project tapered portions 33, 34, 35 and 36. As shown in Fig. 6, the taper of these fingers, at their base, is comparatively blunt, as indicated at 37, but the taper is more acute at the outer portions, as indicated at 38. Also it will be noted that the projection 34 is wider than the other projections for a purpose which will be hereinafter set forth.

In the process of construction according to the present invention, the band 28 is adapted to form the flange 19, the portions 37 are adapted to form the flat portion 20, while the projections 38 are adapted to form part of the hub 14. This may be accomplished in several ways. According to the preferred method, the blank is provided with an offset 39, so that the lower projections are bent at right angles to the plane of the main portion of the band 28 and the fingers which form the spokes. A further offset 40 is formed in the region of the break between the tapers 37 and 38, so that the fingers 33, 34, 35 and 36 are parallel to but spaced from the plane of the band 28 by a substantially perpendicular shoulder formed by the tapered portions 37.

The wider finger 34 is crimped or stamped to provide a key portion, such as indicated at 41 in Fig. 3. The width of the portion 34 is such that after the formation of the key 41, the portion 34 will be of the same width as that of the remaining portions. This key may be formed before, during or after the offsetting of the blank as just described.

The next step in the formation of the member 11 is the rolling of the offset blank into a tubular form, as shown in Fig. 10. The two ends of the band 28 will be brought together to form a cylinder. The tapered portions 37 being offset inwardly, will fit together to form the radial flange 20 from which will depend the projections 33, 34, 35 and 36. While the lower portions of projections 33, 34, 35 and 36 will not contact throughout their lengths, they will be given a curvature so as to constitute portions of a common conical surface.

The fingers 29, 30, 31 and 32 are then bent downwardly and outwardly, so as to radiate from the hub portion 14, thus forming the spokes of the wheel.

The formation of the offsets 39 and 40 before the rolling operation is the preferred method, but it is also within the purview of the invention to first roll the blank into a tube, and then form the offsets 39 and 40. This will result in forming the flange 19 before forming the disk 20 and the hub 14. In other words, the rolling is not limited in the sequence of operations described.

It should be noted that the formation of the member 11, as described, will leave between the projections 33, 34, 35 and 36 a plurality of V-shaped notches, such as indicated at 42 in Fig. 4. A second blank, of the contour shown in Fig. 7, is stamped out of a flat piece of sheet metal, and comprises a band portion 43 and wedge portions 44 projecting therefrom. This member is rolled into a cylindrical form, the ends of the band 43 being brought together for this purpose, and resulting in the cylindrical member shown in Fig. 8. The projections 44 are adapted to be fitted into the V-shaped notches 42 described above.

The collar 27 is fitted over the projections 33, 34, 35 and 36, and the member 43, with the wedges 44 projecting into the notches 42. The collar 27 is then rolled to give it a conical contour, and to force it snugly around the projections and the wedge members 44, causing these members to firmly interfit to form the hub 14.

The lower cover member 24 is pressed very firmly up over the cup portion of the spider, the upper cover member is applied and the portions 23 thereof are folded down under the flange 26 of the lower cover member, thus securing these parts together. These steps may be performed separately and in any desired order, or they may take place in a single pressing operation. In assembling these parts the edges of the band 40 are preferably spaced 180° from the joint between the ends of the band 28.

The wheel may be assembled on the tapered end of the steering column 47 by fitting the hub 14 thereover, and applying a washer 50 of sufficient area to provide a substantial bearing on the flat portion 20. When a nut 52 is applied to the threaded upper end 51 of the steering column the washer 50 will urge the hub 14 into frictional engagement with the tapered portion of the steering column, and draw the wedges 44 up into the notches 42, the parts being prevented from spreading by the collar 27.

It is obvious that if the cupped formation is not desired, the structure and steps for the construction thereof may be omitted. In this event the same blank may be used, except that the band 28 will be comparatively narrow, merely of sufficient width to form a flange connecting the spokes. Then, in forming the insert, the offset 39 is omitted, and the band 28 will be rolled into a flat annulus, rather than a tube. This rolling will cause the spokes to radiate, so that no bending thereof is necessary. Thus in the completed insert, the flat flange 20 will be in the plane of the spokes, the flange 19 being omitted. Similarly, the top plate flange 21 will extend thereacross, the flange 22 being omitted, and the bottom plate flange 26 may join the flange 25 thereof, with no intermediate cupped portion.

In cutting the blanks such as shown in Fig. 6 from the sheet metal stock, after one blank has been cut, a second blank may be so cut that the portions 29, 30, 31 and 32 are cut from the metal remaining with the stock sheet from between the corresponding portions of the first blank. A further blank may be so cut that its portions 33, 34, 35 and 36 are cut from the metal remaining from between the corresponding portions of the second blank, and so on. In this manner the scrap metal may be reduced to a minimum.

While one embodiment of the novel construction and method has been set forth in detail for the purposes of adequate disclosure, the invention is not to be limited to any of the details disclosed, but instead includes such embodiments of the broad idea as fall within the scope of the appended claims.

Having thus described our invention, what we claim is:

1. A sheet metal blank for a steering wheel spider, comprising a transverse band, relatively long projections from one edge of said band adapted to form spokes of the wheel, and relatively short projections from the other edge of said band adapted to form the hub of the wheel.

2. A sheet metal blank for construction of a steering wheel spider, comprising a transverse band, projections from one edge of said band, and shorter projections from the other edge thereof, said shorter projections comprising mitered portions adapted to form a radial flange, and portions adapted to form a hub.

3. The method of forming a steering wheel spider, which consists in stamping out a sheet metal blank to form a band portion, spoke portions extending laterally from one edge of said band portion, and shorter projections at the other edge of said band portion, offsetting the shorter projections, rolling said band portion into the form of a tube, and bending the spoke portions outwardly.

4. The method of forming a spider for a steering wheel, which consists in stamping out a sheet metal blank to form a band portion, spoke portions on one edge of said band portion, and shorter projections on the other edge thereof, rolling the stamped blank into the form of a tube, forming the projections into a smaller tube and bending outwardly the spoke portions.

5. The method of forming a spider for a steering wheel, which consists in stamping out a sheet metal blank to form a band portion, spoke portions on one edge of said body portion and projections on the other edge thereof, forming an offset in said blank, rolling the stamped blank into the form of a tube, the offset forming a cup portion and the projections forming a hub, and bending outwardly the spoke portions.

6. In a method of forming a spider for a steering wheel, steps which consist in forming from a single piece of sheet metal a band portion with hub portions projecting from one side thereof, offsetting said hub portions with respect to said band, and rolling the stamped blank into the form of a tube.

7. The method of forming a spider for a steering wheel, which consists in stamping out a sheet metal blank to form a band portion, spoke portions on one edge of said band portion, and mitered projections on the other edge thereof having shorter projections, rolling the stamped blank into the form of a tube, forming the mitered portions into a flange and the shorter projections into a smaller tube, and bending outwardly the spoke portions.

8. The method of forming a spider for a steering wheel, which consists in stamping out a sheet metal blank to form a band portion, spoke portions on one edge of said band portion, and shorter projections on the other edge thereof, rolling the stamped blank into the form of a tube, forming the projections into a smaller tube, fitting a collar around said smaller tube, rolling the collar and shorter projections to give them common conical contour, and bending outwardly the spoke portions.

9. The method of forming a steering wheel spider, which consists in stamping out a sheet metal blank to form a band portion, spoke portions extending laterally from one side of said band portion, and shorter projections at the other side of said band portion, crimping one of said shorter projections to form a key, offsetting the shorter projections, rolling said band portion into the form of a tube, and bending the spoke portions outwardly.

10. A blank for forming a steering wheel comprising a band portion, spoke portions projecting at one edge of said band portion, and hub portions projecting from the other edge of said band portion, said hub portions being so arranged that a second blank may be cut from the stock sheet with its hub portions cut from metal remaining with the stock sheet from between the hub portions of the first mentioned blank.

11. The method of forming a metallic steering wheel insert which comprises rolling a sheet metal blank to form a tubular body having integral spoke and hub portions, and bending a part of the hub portion of said blank substantially radially inwardly to provide the hub portion of said body with an integral key.

12. The method of forming a spider for a steering wheel which consists in stamping out a sheet metal blank to form a band portion, spoke portions on one edge of said band portion, hub-forming portions on the other edge of said band portion, one of said hub-forming portions being wider than the remainder of said hub-forming portions, rolling the stamped blank into the form of a tube, and bending radially inwardly the wide hub-forming portion to provide the hub-portion of said body with an integral key.

In testimony whereof, we hereunto affix our signatures.

BUDD BRONSON.
EDWARD R. MARBACH.